United States Patent [19]
Asai et al.

[11] Patent Number: 5,949,620
[45] Date of Patent: Sep. 7, 1999

[54] MAGNETIC HEAD DRUM ASSEMBLY

[75] Inventors: Shigemi Asai; Tohru Okuda, both of Nara, Japan

[73] Assignee: Sharp Kabushiki Kaisha, Osaka, Japan

[21] Appl. No.: 08/820,867

[22] Filed: Mar. 20, 1997

[30] Foreign Application Priority Data

Mar. 22, 1996 [JP] Japan .................................... 8-065822

[51] Int. Cl.⁶ .............................. G11B 5/52; G11B 21/18
[52] U.S. Cl. ............................................. 360/107; 360/84
[58] Field of Search ............................. 360/107, 84, 85, 360/130.24

[56] References Cited

FOREIGN PATENT DOCUMENTS

61-59611  3/1989  Japan .
3-89513   9/1991  Japan .
4-95256   3/1992  Japan .

Primary Examiner—George J. Letscher
Attorney, Agent, or Firm—David G. Conlin; William J. Daley, Jr.

[57] ABSTRACT

Featured is a magnetic drum assembly including a rotary drum supporting a magnetic head for recording/reproducing information on a magnetic tape and a stationary drum secured to a base of a magnetic recording/reproducing device. In one aspect of the invention, the stationary drum is molded from a resin material together with a metal material partially embedded and partially exposed and being secured at the exposed part of the metal to the base of the magnetic recording/ reproducing device. In another aspect of the invention, the rotary drum is molded from a resin material together with a metal material partially embedded and partially exposed and the magnetic head is secured at the exposed part of the metal of the rotary drum. Such a drum assembly is advantageous in that it is capable of maintaining an initial accuracy of its sizes and shape without deterioration in its mechanical properties over time due to creep deformation and internal stress.

6 Claims, 5 Drawing Sheets

MAGNETIC HEAD DRUM ASSEMBLY

BACKGROUND OF THE INVENTION

A rotary head type magnetic recording/reproducing device, such as video cassette recorder (VCR) or a digital audio tape recorder (DAT), has mounted therein a rotary center-shaft type magnetic head drum whose center shaft rotates together with the rotary drum or a stationary center-shaft type magnetic head drum whose center shaft is secured to a stationary drum.

The rotary center-shaft type magnetic head drum assembly is composed of a rotary drum provided with, at least, a magnetic head, a rotary side transformer coil of a rotary transformer, a rotor and a center shaft of a motor and a stationary drum provided with, at least, a fixed side transformer coil of the rotary transformer and a stator of the motor.

The stationary center-shaft type magnetic head drum assembly is composed of a rotary drum provided with, at least, a magnetic head, a rotary side transformer coil of a rotary transformer, a rotor of a motor and a center shaft and a stationary drum provided with, at least, a fixed side transformer coil of the rotary transformer, a stator of a motor and a center shaft.

The rotary drums and the stationary drum are usually manufactured by a casting or forging process for preforming configurations of products and a machining process for cutting, drilling, tapping and finishing the cast or forged products. Because of the number of manufacturing steps, these drums are expensive parts among components of a complete magnetic recording/reproducing device. It is, therefore, strongly desired to realize a considerable reduction in their manufacturing cost.

To realize this, attempts have been made to manufacture the rotary and stationary drums by precision injection molding or precision compression molding from high-polymer resin material. The precision injection molding and the precision compression molding are respected to bring a considerable reduction in costs of the drums because both methods can save steps and time for manufacturing the products. However, these drums must be finished to attain an accuracy on the order of one micron in its size and shape. Such a high accuracy can not be obtained by the precision injection or compression molding only since molded products may have sink, warp and creep deformation.

In view of the above-mentioned problems, Japanese Laid-Open Patent Publication No. 4-95246 proposes a drum that has a body made of material such as an aluminum die-cast with resin layers formed on a tape-guiding surface and an internal surface of a bearing bore. It is said that the drum can be formed by precise compression molding without additional machining process and therefore it can be produced at a considerably reduced cost.

Japanese Laid-Open Patent Publication No. 64-59611 discloses a drum which has a core housing made of metal or ceramics with a tape-transport portion formed thereon from resin material. This enables the drum to be produced at a considerably reduced cost because the precise machining process is eliminated. Furthermore, its resin-made portion is thin enough to keep a high accuracy of size and shape with reduced sink, warp and creep as compared with a whole resin-made product. The metal- or ceramic-made core-housing of the magnetic head drum is rigid enough to be reliably fixed on its base. Namely, Japanese Laid-Open Patent Publication Nos. 4-95256 and 64-59611 realize savings in manufacturing cost of the drum products by forming only particularly accurate portions (e.g., tape-transport or tape-guiding portion and bearing bore surface) from resin material, thus eliminating the need of machining metal or ceramic material. However, the magnetic head drum assembly also requires high accuracy of other portions (e.g., fixing parts) which must be additionally machined in practice. As a matter of fact, the drum assembly is still expensive.

Japanese Laid-Open Patent Publication No. 3-89513 discloses a rotary drum which is formed from resin material with inserted members enclosed thereby. This may simplify the manufacturing process because the portions required to be accurate in size and shape are formed from resin material.

However, the rotary drum described in Japanese Laid-Open Patent Publication No. 3-89513 has a number of drawbacks from the viewpoint that it is a component to be assembled into a magnetic head drum unit whose performance has to meet the technical requirements of a completely assembled product. Namely, the magnetic head drum assembly involves the following problems:

A first problem lies in that the magnetic head drum, secured at its resin-made portion to a base plate (substrate), may be subjected to not-negligible long-term deformation of resin material due to creep or internal stress therein, resulting in deterioration of initial size and shape accuracies. The same problem may occur in a magnetic head mounting portion of the rotary drum.

A second problem lies in that a rotary drum and a stationary drum, which are formed from resin material (crystalline polymer in particular), has a poor ability of bonding thereto a rotary-side transformer coil and fixed-side transformer coil, respectively, of a rotary transformer. Necessary bonding strength can not be obtained.

A third problem is that the magnetic head drum formed from resin material can not be sufficiently shielded against EMI (electro magnetic interference) because resin material filled with conductive filler can attain conductivity of $10^3 \Omega$ (not exceeding the limit of semi-conductor). As a result of this, it may reproduce a signal containing electromagnetic noise that deteriorates the reproduced image quality.

A fourth problem lies in that the magnetic head drum requires reliable fixture and support of its bearing with a center shaft (for the rotary center-axis type) or its center shaft with bearing (for the fixed center-axis type) but it can not maintain for a long term the initial size and shape accuracies and impact strength enough to withstand a drop test with acceleration of several hundreds of G because of the above-described deterioration of the resin material under the influence of creep and internal stress.

SUMMARY OF THE INVENTION

The present invention relates to a magnetic head drum assembly to be mounted on a rotary head type magnetic recording/reproducing device for recording/reproducing information on a recording media of magnetic tape.

The present invention is directed to provide a magnetic head drum assembly composed of a rotary drum and stationary drum, which are formed from injection molded or compression molded resin material without deterioration in accuracies of its size and shape due to prolonged internal stress and creep deformation of material and which assembly can, therefore, maintain the initial size and shape accuracies, assures sufficient bonding strength and reliable shield against EMI and maintain necessary drop-impact strength for a long period of its service.

To achieve the above-mentioned object, a magnetic head drum assembly according to the present invention comprises:

(1) A rotary drum bearing a magnetic head for recording signals on a magnetic tape and/or reproducing recordings thereon and a stationary drum being secured to a base of a magnetic recording/reproducing device. It is characterized in that the stationary drum is molded from resin material with a metal insertion integrally potted therein but partially exposed thereat and is secured at the exposed metal portion to the base of the magnetic recording/reproducing device.

(2) A rotary drum bearing a magnetic head for recording signals on a magnetic tape and/or reproducing recordings thereon and a stationary drum. It's characterized in that the rotary drum is molded from resin material with a metal insertion integrally potted therein but partially exposed thereat and the magnetic head is secured to the exposed metal portion of the rotary drum.

(3) A rotary drum bearing a magnetic head for recording signals on a magnetic tape and/or reproducing recordings thereon and a stationary drum. It's characterized in that the stationary drum is molded from resin material with a metal insertion integrally potted therein but partially exposed thereat and a transformer coil of a rotary transformer for transferring signals to and from the magnetic head is bonded with adhesive to the exposed metal portion of the stationary drum.

(4) A rotary drum bearing a magnetic head for recording signals on a magnetic tape and/or reproducing recordings thereon and a stationary drum. It's characterized in that the stationary drum is molded from resin material with a metal insertion integrally potted therein and is connected at the metal insertion to the ground.

(5) A rotary drum bearing a magnetic head for recording signals on a magnetic tape and/or reproducing recordings thereon and a stationary drum. It's characterized in that at least either of the rotary drum and the stationary drum is molded from resin material with a metal insertion integrally potted therein but partially exposed thereat and a center shaft with a bearing for rotation of the rotary drum is secured to the exposed portion of the metal insertion.

The term "exposed portion" used in the description above and claims also includes the case where a whole or a part of an exposed portion of the metal insertion is covered with a very thin layer of resin material. This thin layer is formed by the resin melted and flashed over a metal surface to be substantially exposed when forming resin material with the metal insertion in a mold. Thickness of this thin flash-resin layer depends upon molding conditions (e.g., fluidity of resin material, construction of a molding tool, injection pressure, injection rate, tool temperature and resin temperature), but it usually does not exceed 0.1 mm.

PREFERRED EMBODIMENTS OF THE INVENTION

Prior to explaining preferred embodiments of the present invention, prior art magnetic head drum assembly will be described below as references for the present invention.

A rotary head type magnetic recording/reproducing device, such as video cassette recorder (VCR) or a digital audio tape recorder (DAT), has mounted therein a rotary center-shaft type magnetic head drum whose center shaft rotates together with the rotary drum or a stationary center-shaft type magnetic head drum whose center shaft is secured to a stationary drum.

Figure 1:
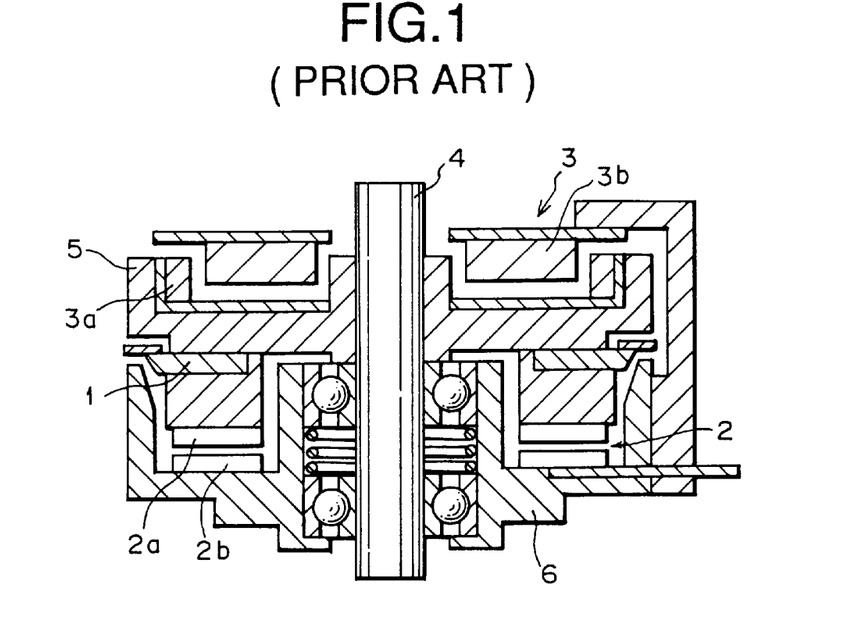
FIG. 1 is sectional view showing a construction of a conventional magnetic head drum having a rotary center shaft.

As shown in FIG. 1, the rotary center-shaft type magnetic head drum assembly is composed of a rotary drum 5 provided with, at least, a magnetic head 1, a rotary side transformer coil 2a of a rotary transformer 2, a rotor 3a and a center shaft 4 of a motor 3 and a stationary drum 6 provided with, at least, a fixed side transformer coil 2b of the rotary transformer 2 and a stator 3b of the motor 3.

Figure 2:
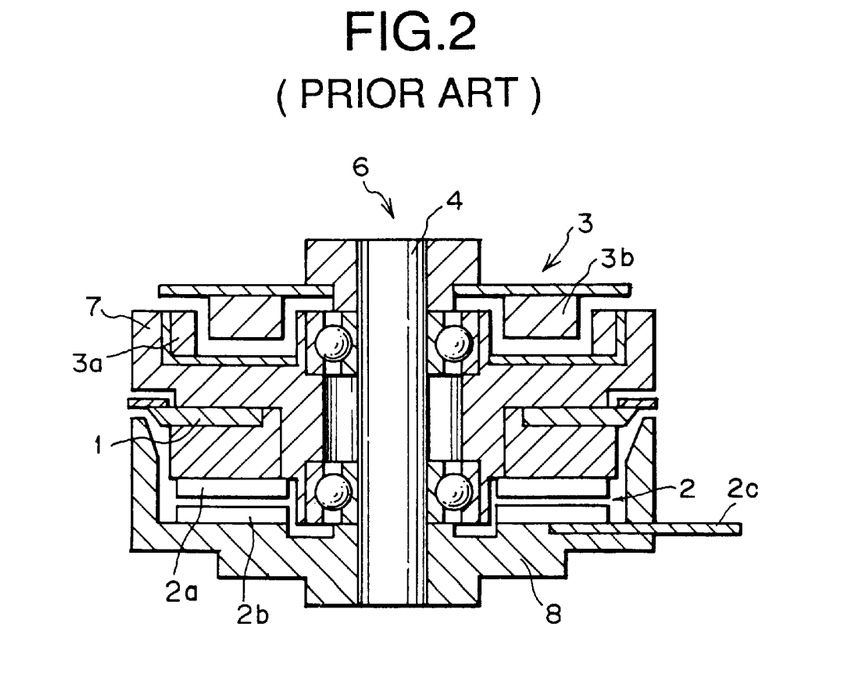
FIG. 2 is sectional view showing a construction of a conventional magnetic head drum having a fixed center shaft.

As shown in FIG. 2, the stationary center-shaft type magnetic head drum assembly is composed of a rotary drum 7 provided with, at least, a magnetic head 1, a rotary side transformer coil 2a of a rotary transformer 2, a rotor 3a of a motor 3 and a center shaft 4 and a stationary drum 8 provided with, at least, a fixed side transformer coil 2b of the rotary transformer 2, a stator 3b of a motor 3 and a center shaft 4.

Figure 8:
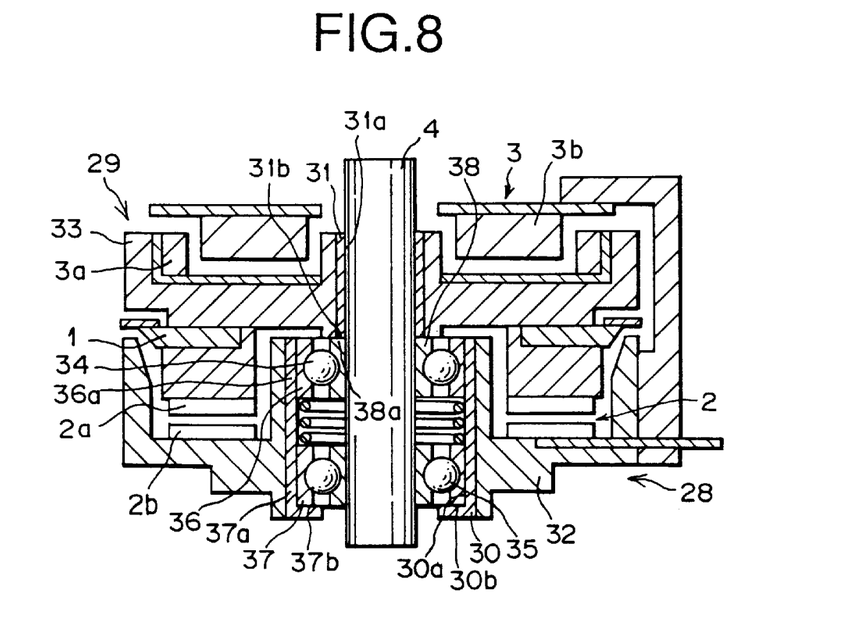
FIG. 8 is sectional view showing a construction of a fourth embodiment of a magnetic head drum assembly according to the present invention.
Figure 9:
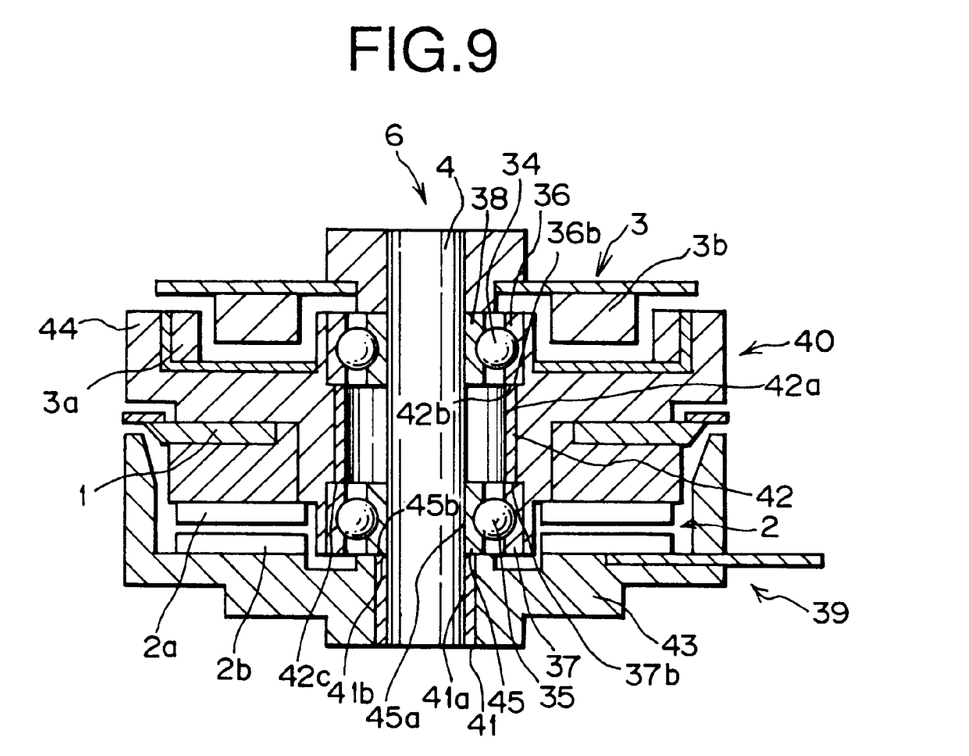
FIG. 9 is sectional view showing a construction of another example of the fourth embodiment of a magnetic head drum assembly according to the invention.

The rotary drums 5, 7 and the stationary drum 6, 8, which are shown in FIGS. 8 and 9, are usually manufactured by casting or forging process for preforming configurations of products and machining process for cutting, drilling, tapping and finishing the cast or forged products. Because of the number of manufacturing steps, these drums are expensive parts among components of a complete magnetic recording/reproducing device. It is, therefore, strongly desired to realize a considerable reduction in their manufacturing cost.

Referring to accompanying drawings, preferred embodiments of the present invention will be described below in detail. It should be understand that the preferred embodiments are explained with various kinds of preferable technical conditions but the scope of the present invention is not limited to the embodiments unless otherwise specified. Components similar to those in the conventional device (prior art) are designated by the same numerals.

Embodiment 1

Figure 3:
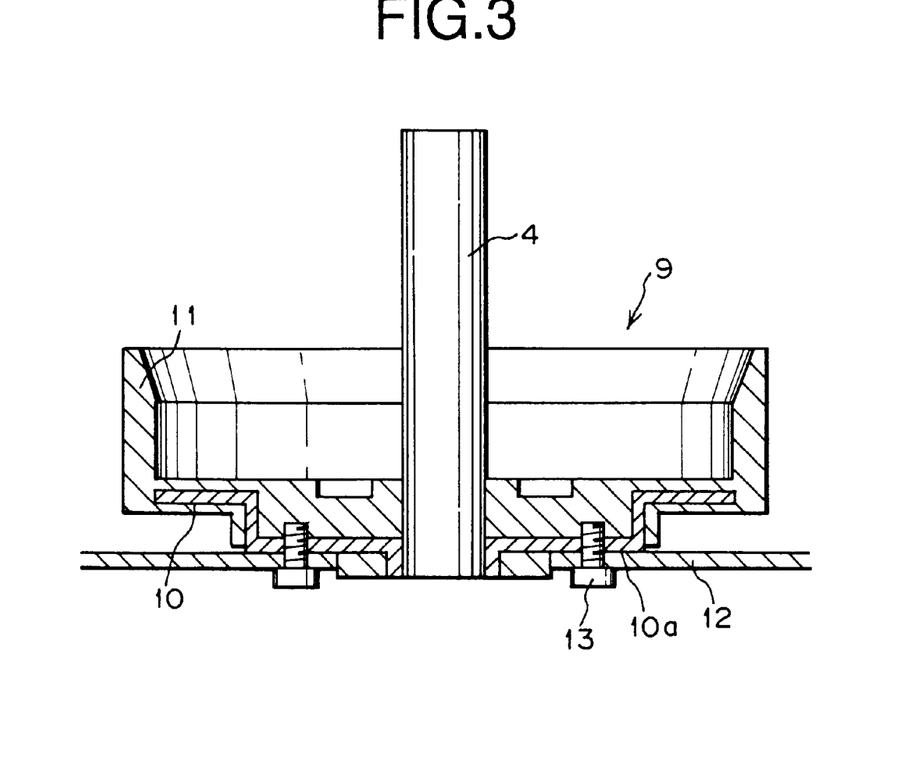
FIG. 3 is a sectional view showing a construction of a first embodiment of a magnetic head drum assembly according to the present invention.

FIG. 3 is a sectional view of a magnetic head drum assembly which is a first embodiment of the present invention. In FIG. 1, a stationary drum 9 has a metal-made core member 10 therein. This core member 10 is made of inexpensive metal such as aluminum, iron and stainless steel and formed by a suitable method, e.g., press-forming or a combination of press forming and fine blanking or die-casting. The stationary (fixed) drum has a resin-made housing member 11 that encloses the core member 10. The housing member 11 with an insertion of the core member 10 is formed into one-piece structure from resin material (e.g., thermosetting resin or thermoplastic resin) by insertion molding. The suitable thermosetting resin is epoxy resin or polyimid resin. The suitable thermoplastic resin is crystalline polymer such as polyphenylenesulfide resin, polyetherimid resin, polyetheretherketone resin, polyacetal resin; amorphous polymer such as polycarbonate resin, polyethersulfoneresin, modified polyphenylenether resin; and liquid crystal polymer such as liquid crystal resin. Each resin material may contain any suitable kinds of filler materials, e.g., inorganic filler for improving the moldability of the resin and conductive filler for giving conductivity to the resin.

The core member 10 has at least three protrusions 10a arranged coaxially with the center shaft 4. These protrusions 10a are projecting beyond the housing member 11 and externally exposed as shown in FIG. 3. The housing member 11 is secured with screws 13 at these exposed protrusions to the base 12 of the rotary head type magnetic recording/reproducing device.

The shown construction of the magnetic head drum adopts fixing the exposed metal portion to the base and, therefore, eliminates the possibility of aged deterioration in size and shape due to creep deformation and internal stress of resin material if the drum is secured at its resin-made portion to the base. Thus, the magnetic head drum can maintain the initial accuracies of its size and shape.

Although the stationary drum composing a fixed center-shaft type magnetic head drum assembly is shown in cross-section in FIG. 3, a stationary drum composing a rotary center-shaft type magnetic head drum assembly has a similar construction assuring the same feature.

Figure 4:
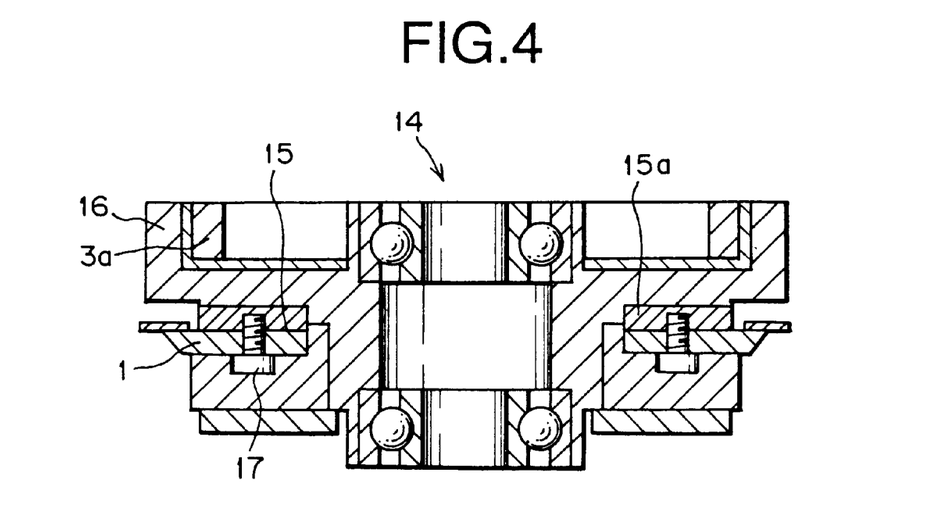
FIG. 4 is sectional view showing a construction of another portion of the first embodiment of a magnetic head drum assembly according to the present invention.

FIG. 4 is a sectional view showing another portion of the above-mentioned magnetic head drum assembly. The rotary drum 14 has a metal-made core member 15 inserted therein. This core member 15 can be made of the same material and by the same method as the stationary drum is made. The rotary drum 14 has a resin-made housing member 16 that encloses the core member 15. This housing member 16 can be made of the same material by the same method as that of the stationary drum. The core member 15 has at least the same number of protrusions 15a as that of magnetic heads. These protrusions 15a are arranged coaxially with the center shaft and are projecting beyond the housing member 16 to be externally exposed as shown in FIG. 4. Each magnetic head 1 is secured with a screw 17 to one of the exposed metal protrusions 15a of the rotary drum 14.

The shown construction of the magnetic head drum bears the magnetic head secured to the exposed metal portion and, therefore, eliminates the possibility of age deterioration of accuracies of size and shape due to creep deformation and internal stress of resin material if the magnetic head is secured to the resin-made portion of the drum. Thus, the magnetic head drum can maintain the initial accuracies of its size and shape.

Although the rotary drum composing a fixed center-shaft type magnetic head drum assembly is shown in cross-section in FIG. 3, a rotary drum composing a rotary center-shaft type magnetic head drum assembly has a similar construction assuring the same feature.

Embodiment 2

Figure 5:
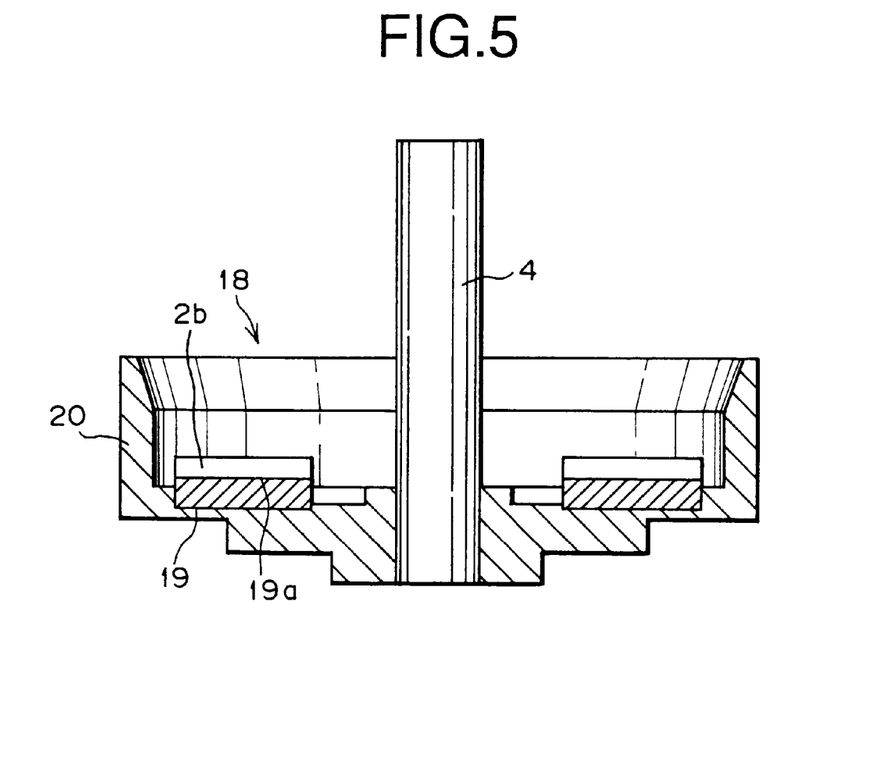
FIG. 5 is a sectional view showing a construction of a second embodiment of a magnetic head drum assembly according to the present invention.

FIG. 5 is a sectional view of a magnetic head drum assembly which is a second embodiment of the present invention. In FIG. 4, a stationary drum 18 has a metal-made core member 19 therein. This core member 19 can be made of the same material and by the same method as described before for the first embodiment. The stationary drum 18 has a resin-made housing element 20 that encloses the core member 19. This housing member 20 can be made of the same material and by the same method as described for the first embodiment. The core member 19 has at least three protrusions 19a formed coaxially with a center shaft 4 or at the periphery thereof. These protrusions 19a are projecting externally from the housing member 20 and exposed as shown in FIG. 5. A fixed-side coil 2b of a rotary transformer 2 is bonded with adhesive directly to an exposed metal surface of one of the protrusions 19a.

The shown construction of the magnetic head drum bears the fixed-side transformer coil bonded to the exposed metal portion and, therefore, eliminates the possibility of deterioration in bonding strength of resin material (e.g., crystalline polymer type in particular) if the transformer coil is bonded to the resin-made portion of the drum. Thus, the magnetic head drum can maintain the sufficient bonding strength.

Although the rotary drum composing a fixed center-shaft type magnetic head drum assembly is shown in cross-section in FIG. 5, a rotary drum composing a rotary center-shaft type magnetic head drum assembly has a similar construction assuring the same feature. In FIG. 5, there is also shown a cross-section of an opposed-surface-type rotary transformer. It is of course to attain the same effect when an opposed-circumference-type rotary transformer is used.

Figure 6:
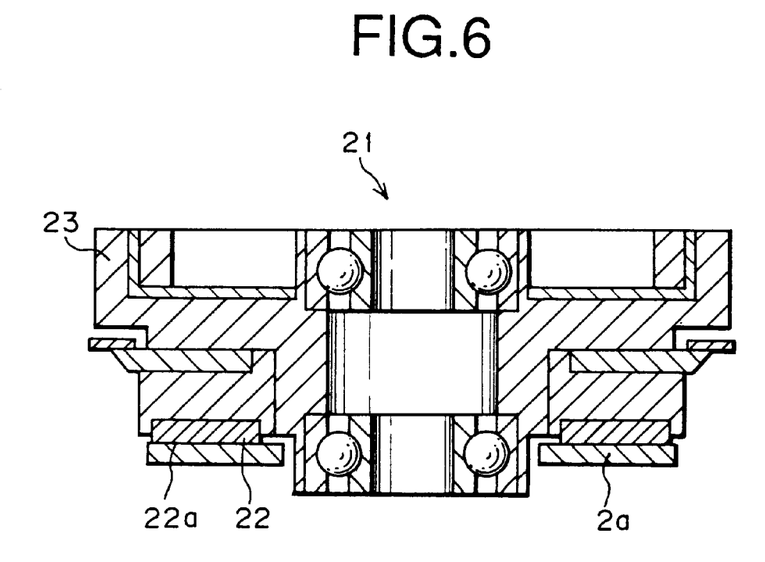
FIG. 6 is sectional view showing a construction of another portion of the second embodiment of a magnetic head drum assembly according to the present invention.

FIG. 6 is a sectional view showing another portion of the above-mentioned magnetic head drum assembly. The rotary drum 21 has a metal-made core member 22 inserted therein. This core member 22 can be made of the same material and by the same method as the stationary drum is made. The rotary drum 21 has a resin-made housing member 23 that encloses the core member 22. This housing member 23 can be made of the same material by the same method as that of the stationary drum. The core member 22 has at least three protrusions 22a arranged coaxially with the center shaft or at the periphery thereof. They are projecting beyond the housing member 23 and externally exposed as shown in FIG. 6. A rotary-side coil 2a of a rotary transformer 2 is bonded with adhesive directly to one of the exposed protrusions 22a of the metal core member 22.

The shown construction of the magnetic head drum bears the rotary-side transformer coil 2a bonded to the exposed metal portion and, therefore, eliminates the possibility of deterioration in bonding strength of resin material (e.g., crystalline polymer type in particular) if the transformer coil is bonded to the resin-made portion of the drum. Thus, the magnetic head drum can maintain the sufficient bonding strength.

Although the rotary drum composing a fixed center-shaft type magnetic head drum assembly is shown in cross-section in FIG. 6, a rotary drum composing a rotary center-shaft type magnetic head drum assembly has a similar construction assuring the same feature. In FIG. 6, there is also shown a cross-section of an opposed-surface type rotary transformer. It is of course to attain the same effect when an opposed-circumference type rotary transformer is used.

Embodiment 3

Figure 7:
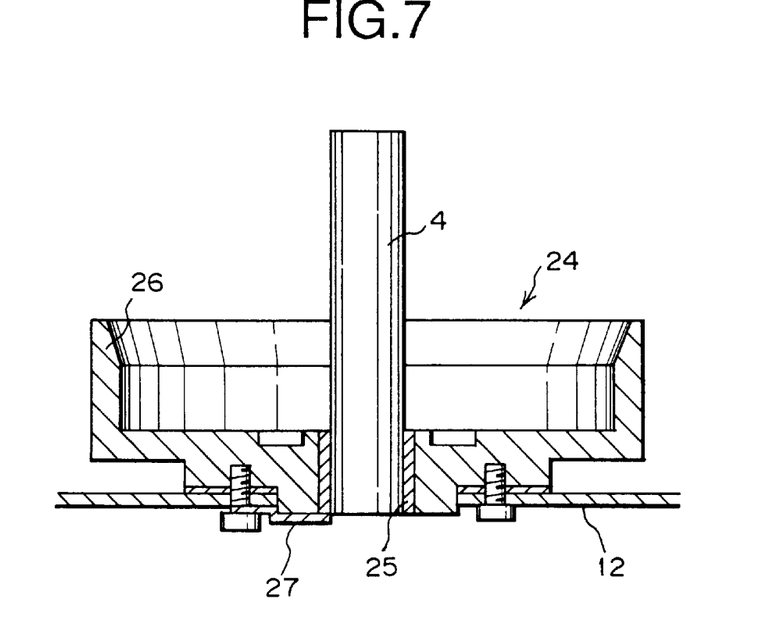
FIG. 7 is sectional view showing a construction of a third embodiment of a magnetic head drum assembly according to the present invention.

FIG. 7 is a sectional view of a magnetic head drum assembly which is a third embodiment of the present invention. In FIG. 7, a stationary drum 24 has a metal-made core member 25 therein. This core member 25 can be made of the same material and by the same method as described before for the first embodiment. The stationary drum 24 has a resin-made housing member 26 that encloses the core member 25. This housing member 26 can be made of the same material and by the same method as described for the first embodiment. A leading wire 27 is connected at one end to the core member 25 and at the other end to a base 12 of a rotary head type magnetic recording/reproducing device.

The shown construction of the magnetic head drum can lead electromagnetic noise existing about the magnetic head drum to the base 12, thus realizing a sufficient EMI shield (electromagnetic noise shield). Namely, this prevents occurrence of an electromagnetic noise failure that a resin-made stationary drum 24 may suffer and, thereby, assures the high quality of a video image.

An EMI shield for the rotary drum (not shown) can be achieved by leading electromagnetic noise existing around the rotary drum to the stationary drum 24 through a center shaft 4.

Although the stationary drum 24 shown in FIG. 7 is grounded by use of a leading wire, it is of course possible to directly connect the core member 25 of the drum to the base 12.

Although the stationary drum shown in FIG. 7 is a component of a fixed center-shaft type magnetic head drum assembly, a stationary drum composing a rotary center-shaft type magnetic head drum assembly has a similar construction assuring the same feature.

Embodiment 4

FIG. 8 is a sectional view of a rotary center-shaft type magnetic head drum assembly which is a fourth embodiment of the present invention. In FIG. 8, a stationary drum 28 has an inserted metal-made core member 30 and a rotary drum 29 has an inserted metal-made core member 31. Both core members 30, 31 can be made of the same material and by the same method as those described before for the first embodiment. The stationary drum 28 and the rotary drum 29 are provided with external housing members 32 and 33 respectively, which enclose the respective core members 30 and 31. These housing members 32 and 33 can be made of the same material and by the same method as described before for the first embodiment. The core member 30 has a cylindrical surface 30a formed coaxially with a center shaft 4, which cylindrical surface 30a has an inwardly bent end-portion 30b. As seen in FIG. 8, the bent-end portion 30b of the cylindrical surface 30a is projecting beyond the housing member 32 and externally exposed for locating and fixing outer rings (outer stators) 36 and 37 of a bearing 34 and 35. Namely, the core member 30 supports the outer cylindrical portions 36a and 37a of the outer ring 36 and 37 by its cylinder portion 30a and supports the end portion 37b of the outer ring 37 by its end portion 30b. The core member 31 has a cylindrical surface 31a formed coaxially with the center shaft 4. As seen in FIG. 8, an end portion 31b of the cylindrical surface 31a is projecting beyond the housing member 33 and exposed externally for locating and fixing an inner ring (inner rotor) 38. Namely, core member 31 supports the center shaft by its cylinder portion 31a and supports an end portion 38a of the inner ring 38 by its end portion 31b.

Thus, the magnetic head drum assembly is provided with metal-made portions for fixing the center shaft 4 and outer rings 36, 37 and the inner ring 38 of the bearings 34 and 35 and, therefore, eliminates the possibility of age deformation of resin material due to creep deformation and residual stress that may be produced if the resin-made portion is secured. This means that the magnetic head drum assembly can maintain initial accuracies of its size and shape. Since mechanical properties (e.g., Young's modulus) of metal material are excellent as compared with mechanical properties (e.g., flexural modulus) of resin material, the magnetic head drum assembly can reliably support the center shaft 4 and the bearings 34, 35 by its metal-made portions and, therefore can maintain its impact strength enough to withstand a drop test with an acceleration of several hundreds of G for a long period of its service.

It is of course possible to obtain the same effect when the present invention is applied to only the stationary drum 28 or the rotary drum 29.

FIG. 9 is a sectional view showing another portion of the above-mentioned fourth embodiment that is a fixed center-shaft type magnetic head drum assembly. A stationary drum 39 has a metal-made core member 41 inserted therein and a rotary drum 40 has a metal-made core member 42 inserted therein. The core members 41 and 42 can be made of the same material and by the same method as those described before for the first embodiment. The stationary drum 39 has a resin-made housing member 43 externally enclosing the core member 41 and the rotary drum 40 has a resin-made housing member 44 externally enclosing the core member 42. These housing members 43 and 44 can be made of the same material and by the same method as those described before for the first embodiment. The core member 41 has a cylindrical surface 41a formed coaxially with a center shaft 4. The cylindrical surface of the core member 41 extends beyond the housing member 43 and is externally exposed to fix thereto the center shaft 4 and an inner ring (inner stator) 38 and 45 of bearings 34 and 35. Namely, the core member 41 locates and supports the center shaft 4 by its cylindrical portion 41a and the bearing inner-ring end 45b by an end face 41b of the cylindrical portion 41a.

The core member 42 has a cylindrical surface 42a formed coaxially with a center shaft 4. The cylindrical surface of the core member 42 extends beyond the housing member 44 and is externally exposed to fix thereto the center shaft 4 and an outer ring (outer rotor) 36 and 37 of bearings 34 and 35. Namely, the core member 42 locates and supports end faces 36b and 37b of the outer rings 36 and 37 by end faces 42b and 42c, respectively, of its cylindrical portion 4a.

Thus, the magnetic head drum assembly is provided with metal-made portions for fixing the center shaft 4 and outer rings 36, 37 and the inner ring 45 of the bearings 34 and 35 and, therefore, eliminates the possibility of age deformation of resin material due to creep deformation and residual stress that may be produced if the resin-made portion is secured. This means that the magnetic head drum assembly can maintain initial accuracies of its size and shape. Since mechanical properties (e.g., Young's modulus) of metal material are excellent as compared with mechanical properties (e.g., flexural modulus) of resin material, the magnetic head drum assembly can reliably support the center shaft 4 and the bearings 34 and 35 by its metal-made portions and, therefore, can maintain its impact strength enough to withstand a drop test with an acceleration of several hundreds of G for a long period.

It is of course possible to obtain the same effect when the present invention is applied to only the stationary drum 39 or the rotary drum 40.

In the above described embodiments 1–4, a whole or a part of the exposed portion of the metal insertion (core member) is covered with a very thin layer of resin material.

This thin layer is formed from the resin melted and flashed over a metal surface to be exposed when forming resin material with the metal insertion in a mold. Thickness of the flash resin layer may depend upon fluidability of resin material, construction of a molding tool and/or molding conditions (e.g., injection pressure, injection rate, tool temperature and resin temperature) but is usually so thin (not more than 0.1 mm) that may maintain the intended effect of the present invention.

As is apparent from the foregoing description, the magnetic head drum assembly according to the present invention offers the following advantageous features:

The magnetic drum assembly can accurately maintain its initial size and shape for a long period since it is fixed at an exposed portion of a metal insertion of the stationary drum and is free from such an age deformation that may occur in a conventional resin-made drum due to creep deformation and residual stress in the resin-made fixed portion.

The magnetic drum assembly can maintain initial accuracies of size and shape of its magnetic head for a long period since the magnetic head is fixed to an exposed portion of a metal insertion of the rotary drum that is, therefore, free from such an age deformation that may occur in a conventional resin-made rotary drum due to creep deformation and residual stress in the resin-made fixed portion.

The stationary and rotary drums can reliably hold fixed-side and rotary-side coils, respectively, of a rotary transformer bonded to exposed portions of metal insertions of the drums, assuring sufficient bonding strength that resin material can not attain. This feature is particularly effective when the housing members of the drums are made of crystalline polymer possessing a low bonding strength.

Furthermore, the metal insertion of the stationary drum is connected to a grounded base to remove electromagnetic noise existing about the magnetic head drum, thus realizing a sufficient EMI shield. Namely, this eliminates the possibility of occurrence of an electromagnetic noise failure that a conventional resin-made drum (without a metal-insertion) may suffer and, therefore, can assures the high quality of a video image reproduced.

An exposed portion of a metal member inserted in at least either stationary drum or rotary drum is used for securing a center shaft and bearings thereto, eliminating the possibility of age deformation of resin material due to creep deformation and residual stress that may be produced if the resin-made portion is secured. This means that the magnetic head drum assembly can accurately maintain its initial size and shape. Since mechanical properties (e.g., Young's modulus) of metal material are excellent as compared with mechanical properties (e.g., flexural modulus) of resin material, the magnetic head drum assembly can reliably support the center shaft and the bearings by its metal-made portions and, therefore can maintain its impact strength enough to withstand a drop impact test with an acceleration of several hundreds of G for a long period.

We claim:

1. A magnetic head drum assembly comprising:

a rotary drum supporting a magnetic head for recording/reproducing information on a magnetic tape;

a stationary drum secured to a base of a magnetic recording/reproducing device;

wherein the stationary drum is molded from resin material into a single piece with a metal insertion partially exposed and is secured at the exposed portion of the metal to the base;

wherein the stationary drum is molded from the resin material integrally with the metal insertion and where the metal insertion is partially exposed at a fixing portion directly abutting and secured to a fixing base; and wherein the metal insertion extends in a central axial direction of the stationary drum and has a partially exposed metal portion extending in a radial direction of the stationary drum and being in direct contact with a center axis of the stationary drum, whereby age deterioration in size and shape of the stationary drum due to creep and internal stress of the resin material is eliminated.

2. A magnetic head drum assembly comprising a rotary drum supporting a magnetic head for recording/reproducing information on a magnetic tape;

a stationary drums;

wherein the rotary drum is molded from a resin material into a single piece with a metal insertion partially exposed;

wherein the magnetic head is secured at the exposed portion of the metal to the rotary drum;

wherein the rotary drum is molded from the resin material integrally with the metal insertion and where the metal insertion is partially exposed at a fixing portion directly abutting and secured to a mounting portion of the magnetic head; and wherein the metal insertion has a partially exposed metal portion extending in a radial direction of the rotary drum, whereby age deterioration in size and shape of the rotary drum due to creep and internal stress of the resin material is eliminated.

3. The magnetic head drum assembly of claim 1, wherein the metal insertion inserted into the stationary drum is covered with a resin cover.

4. The magnetic head drum assembly of claim 2, wherein the rotary drum includes a fixing portion of metal exposed for directly fixing the magnetic head thereto.

5. The magnetic head drum assembly of claim 2, wherein the metal insertion extends in a central axial direction of the rotary drum.

6. A magnetic head drum assembly comprising:

a rotary drum supporting a magnetic head for recording/reproducing information on a magnetic tape;

a stationary drum secured to a base of a magnetic recording/reproducing device;

wherein the stationary drum is molded from resin material into a single piece with a metal insertion partially exposed and is secured at the exposed portion of the metal to the base;

wherein the stationary drum is molded from the resin material integrally with the metal insertion and where the metal insertion is partially exposed at a fixing portion directly abutting and secured to a fixing base; and wherein the metal insertion has a partially exposed metal portion extending in a radial direction of the stationary drum, whereby age deterioration in size and shape of the stationary drum due to creep and internal stress of the resin material is eliminated.

* * * * *